Dec. 21, 1965    E. J. MENNICKEN ETAL    3,224,424
PROCESS FOR IMPROVING COMBUSTION IN
AN INTERNAL COMBUSTION ENGINE
Filed Sept. 30, 1963    2 Sheets-Sheet 2

INVENTORS
ERWIN J. MENNICKEN
FRANZ MUTH
KURT H. STREHLE

BY Jacobi & Davidson
ATTORNEYS

United States Patent Office 3,224,424
Patented Dec. 21, 1965

3,224,424
PROCESS FOR IMPROVING COMBUSTION IN AN INTERNAL COMBUSTION ENGINE
Erwin Joseph Mennicken, Reinbek, near Hamburg, Franz Muth, Hamburg-Blankenese, and Kurt Hermann Strehle, Schonningstedt, near Hamburg-Bergedorf, Germany, assignors to Filtrona Filter G.m.b.H., Glinde, near Hamburg, Germany, a corporation of Germany
Filed Sept. 30, 1963, Ser. No. 312,664
Claims priority, application Germany, Oct. 1, 1962, F 37,931
5 Claims. (Cl. 123—119)

The invention relates to a method and means for improving combustion in an internal combustion engine and more particularly it relates to a device and a process for the reduction in the content of unburnt, especially toxic components, primarily carbon monoxide and polycyclic hydrocarbons, in the exhaust gases of internal combustion engines.

In view of the steadily increasing dangers, caused by the progressively higher concentrations of these noxious exhaust gas components (due to the sharp increase in traffic density), especially in streets with a heavy traffic circulation and even more at halt points, where engines remain idling, a variety of proposals have been put forward, to reduce the content of these components in the exhaust gases. The majority of these proposals relate to a treatment of the exhaust gases after they have left the combustion chamber (cylinder), i.e. a subsequent combustion of the combustible components, contained in the exhaust gases or the return of at least a proportion of the exhaust gases in the cycle into the combustion chamber with the same aim of burning up the unburnt components in the gases. These processes suffer, however, from the general disadvantage not only of being incomplete in their effect, but also of causing a deterioration in the fuel utilization, i.e. a reduction in the performance of the motor. Where catalysts have been used in these processes, to promote the subsequent combustion, these are used up very rapidly, particularly as a result of the action of the lead and sulphur compounds, present as byproducts in the exhaust gases. The further suggestion of injecting additional fuel into the exhaust gas an igniting the mixture over sparking plugs involves a quite uneconomic increase in the fuel consumption.

These processes, moreover, take no or insufficient account of the particular conditions which obtain while the engine is idling, e.g. at halts or in traffic bottlenecks, where the content of toxic components in the exhaust gases exercise the most deleterious effect, as a result of their increasing concentration in the respiratory atmosphere.

These conditions are allowed for in an inherently satisfactory manner by a process, not yet developed to the standard of industrial production, whereby the mixture of fuel and the air, required for the vaporization of the flow of fuel, entering via the slow-running jet, are accelerated between the carburettor and the inlet manifold by being broken down into a number of partial streams, each of very small cross-section, thus meeting the requirement for a maximum distribution of the fuel particles in the mixture, even at idling speeds, thus leading to complete combustion.

A relatively complicated design of equipment is, however, essential to this process.

A process has been devised, however, according to the present invention, which meets the requirement of the complete combustion of the injected fuel even at idling speeds by considerably easier means and at the same time requires no alteration to the design of carburettor. On the contrary the necessary adaptations can easily be made after installation to any known design of carburettor.

In normal carburettors, the air supply for the idling mixture is provided via a hole of small diameter in the carburettor lid, through which flows the comparatively small quantity of additional air, required under these circumstances, and comes into contact with the fuel jet, flowing at a greater velocity through the slow-running jet. The volume of air, supplied through this small opening is distributed in a completely non-uniform manner over the whole cross-section of the inlet manifold with a turbulent effect, so that the velocity is considerably reduced and at the point of contact with the fuel jet is too low, to form with the fuel a suitable mixture for complete combustion. In fact only a very incompletely distribution of the fuel droplets takes place and accordingly the subsequent combustion of the mixture is also incomplete, resulting in the dangerously high carbon monoxide content in the exhaust gases.

It has already been proposed to feed in the amount of air, required for idling speeds, via fixed jets, located in the inlet manifold below the carburettor in the vicinity of the inlet opening of the slow-running jet.

Although this results in a better mixture-formation and a finer distribution of the fuel in the air, the more complete combustion and the reduction in the carbon monoxide content at idling speeds, obtained in this way, have the effect of producing an extraordinary drop in performance when the motor is under load, i.e. at high r.p.m., as a result of the weakening of the mixture by the introduction of additional air.

The regular introduction of constant quantities of extra air in the area between the carburettor and the motor has a further effect, deleterious to the performance of the motor, on the quality of the mixture as a result of the consequent alteration in the flow conditions, which makes itself felt above all at high r.p.m.

A further disadvantage of this system of operation is the overheating of the combustion chamber in the cylinder beyond the permissible temperatures, occuring at high r.p.m. as a result of the excess of oxygen now present. These permissible temperatures are normally chosen on economic grounds to correspond to the maximum load capacities of the materials, of which the pistons and valves in particular are constructed.

The invention makes it possible to make fullest use of the advantages in relation to good mixture formation at idling speeds and complete combustion, offered by a suitable method of extra air supply below the carburettor in the vicinity of the inlet opening of the slow-running jet without the occurrence of the specified disadvantages, in particular the reduction in performance, at higher r.p.m., i.e. when the motor is under load.

This is achieved according to the basic principle of the invention by controlling the quantity of additional air introduced into the induction system behind the carburettor according to the r.p.m. of the motor in such a way that at idling speeds the most advantageous quantity of extra air is introduced to meet these requirements and from the point of view of mixture formation and complete combustion, while with the increase in the r.p.m. of the motor this quantity of air is progressively reduced and in such a way moreover as to afford the most advantageous mixture ratio at all motor speeds. The introduction of this air into the area of the inlet manifold adjacent to the carburettor is effected in accordance with a further characteristic of the invention via a large number of openings of adjustable dimensions, distributed over the circumference of the inlet manifold, in a manner controlled according to the invention by the accelerator lever of the motor, by means of the operation by the accelerator of a valve means, which varies the size of these openings from their full cross-section—at idling speeds—progressively to a completely closed position. The closed position is reached at some predetermined carburettor throttle opening position, which is less than the maximum opening position, and hence is below the maximum r.p.m. of the engine.

Referring to the drawings.

Figure 1:
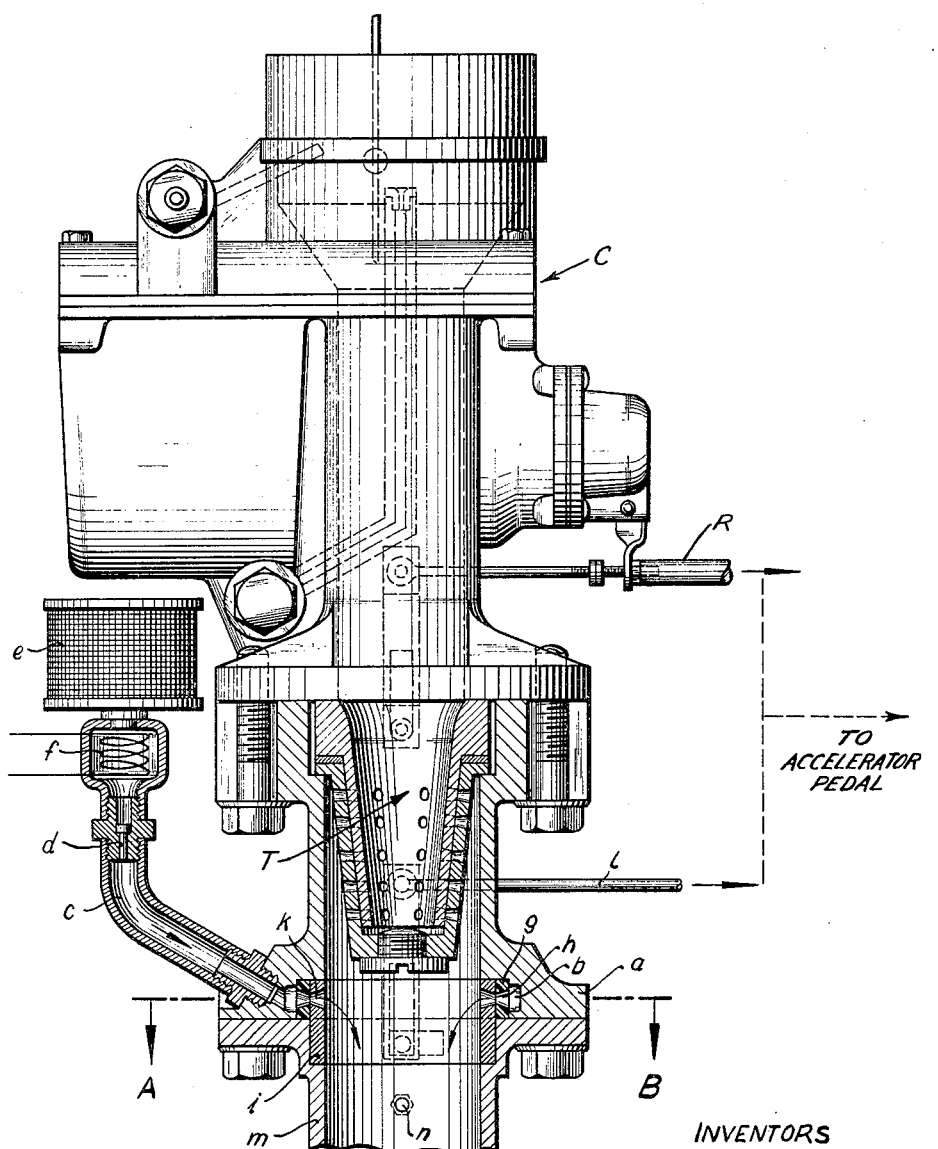
FIGURE 1 is a side elevational view, partly in section, of a carburettor and intake manifold for an internal combustion engine, with an auxiliary air supply means and an air controlling means being provided in accordance with the principles of the present invention.

Although the particular design of carburettor, shown in FIG. 1, is especially advantageous for the application of the basic principle of the invention, its implementation, as has already been noted, does not involve the need for a particular design of carburettor, but the basic principle of the invention is applicable to carburettors of any known design. In the drawings, the carburettor is generally designated C and it includes a throttle valve means generally designated T for controlling the flow rate of the combustible mixture within the carburettor. The throttle valve T includes a pair of concentrically arranged members, each having a plurality of small holes therein, so that the combustible mixture is broken down on its way to the cylinder into a large number of accelerated individual flow streams of very small cross-section. A rod R is linked between the throttle valve T and the accelerator pedal, and by operation of the pedal, one of the throttle valve portions may be moved relative to the other to vary the cross-section of the mixture flow streams in accordance with the power requirements of the motor.

In the auxiliary air supplying and controlling means shown in FIG. 1, a ring flange $a$ is fitted between the carburettor and the inlet manifold, which according to the embodiment of construction forms one piece with the outlet connection of the carburettor, but can also be a component capable of subsequent attachment to a carburettor of any design.

An annular channel $b$ is drilled in this flange, through which the induction air is introduced via a pipe $c$, into which a jet $d$ is inserted, and an air filter $e$, as soon as this annular channel is brought into contact with the inlet manifold. A device to provide a measure of preheating, inserted in the air feed pipe $c$ between the filter $e$ and the jet $d$, is marked $f$.

The annular channel $b$ is sealed on the inside by a static ring element $g$, consisting of metal or plastic, e.g. the plastic material known under the brand name of Teflon, which has evenly distributed round the circumference slot-shaped openings $h$, in this embodiment of construction three slots. On the inner side of the ring element $g$ in the recess, which also goes to form the annular space $b$, is inserted a ring element $i$, consisting for example of bronze, which is supported in a recess, connected to the recess $b$ and also has, evenly distributed over the circumference, openings $k$ of identical shape and size to the openings $h$. This ring element is rotatable by means of a rod $l$, leading to the accelerator pedal of the vehicle.

Figure 2:
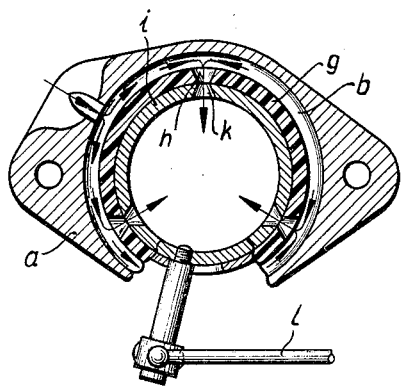
FIGURE 2 is a sectional view taken along the line A–B of FIGURE 1, and showing the air controlling means in an open position.

The openings $k$ of the ring element $i$, which correspond to the openings $h$, and the radial channels, formed by these openings, make up in their aligned, i.e. fully-open, position jets of a Venturi-type cross-section (FIG. 2). This shape for the openings and channels is advantageous but not essential. The cross-section of the slots or equivalent will, however, be shaped appropriately, e.g. slot-shaped or round, to meet the requirements of the individual case, especially those dependent on the characteristics of the particular engine.

By means of rotation of the inner ring element $i$ by the rod $l$ on operation of the accelerator pedal, the size of the openings is reduced from their maximum—position of complete alignment of the available cross-section at idling speeds—progressively as a function of acceleration and increased r.p.m. of the motor, until in the final position (shown in exaggerated form in FIG. 3) the flow passage between the ring element $b$ and the induction inlet is completely closed.

Appropriate quantities of air for idling speeds, measured by the jet $d$, thus flow through the openings into the induction inlet connection $m$, and moreover distributed evenly over the full area of the connection, and make contact in the most advantageous manner with the streams of combustible mixture flowing through the throttle valve T. On the change-over from idling speed to higher r.p.m. the quantity of air is progressively reduced, only to be again increased with a fall in the r.p.m.

From the foregoing descriptive matter, the operation and desirable characteristics of the present invention should become apparent. When the engine is in idling condition, the accelerator pedal is in an undepressed position. In this idle condition, a combustible mixture is still being fed through the throttle valve T to provide combustion in the engine. An extra or auxiliary air supply flows through the pipe $c$ and into the annular channel $b$. The concentric ring members $g$ and $i$ of the air controlling means are in the position shown in FIGURE 2, whereat their respective apertures are aligned, thus permitting the auxiliary air to flow from the annular channel $b$ into the carburettor. This auxiliary air assures that the combustible mixture introduced to the engine will experience complete combustion within the engine, and thus prevents the formation of toxic components in the engine exhaust gases while the engine is in an idling condition.

Figure 3:
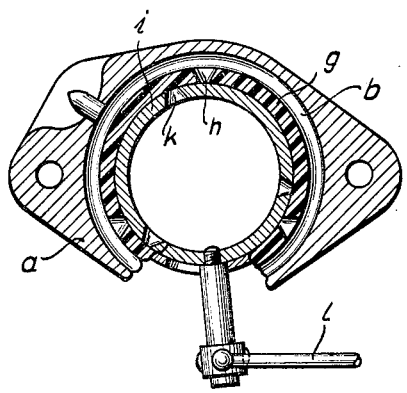
FIGURE 3 is a sectional view, similar to FIGURE 2, but showing the air controlling means in a closed position.

When the engine speed is increased, so that the engine changes from an idling condition to an accelerating condition, a change created by depressing the accelerator pedal, the throttle valve T opens somewhat to permit an increase in the flow rate of the combustible mixture. Simultaneously, the auxiliary air controlling means reduces the amount of extra air being supplied to the carburettor by relative rotation of the concentric ring members $g$ and $i$. Finally, when the engine reaches some predetermined speed, and the throttle T thus reaches some predetermined open position, the apertures in the ring members are moved completely out of alignment with one another, as shown in FIGURE 3, thereby terminating the flow of extra air from the pipe $c$ to the carburettor. This termination or elimination of the extra air supply takes place prior to the throttle means reaching its maximum open position, and hence prior to the engine reaching its maximum speed or r.p.m. By actual experiments, it has been found that the present invention enables the carbon monoxide content of the exhaust gases during idling at e.g. 600 r.p.m., which normally varies between 8 and 10%, to be reduced to 0.3 to 0.6% without the occurrence of any reduction in the performance of the motor under load, i.e. while driving. The invention thus solves, in a substantially simpler and from the technical standpoint more efficient method than the numerous known proposals put forward to date, the problem of reducing the carbon monoxide content of the exhaust gases while the motor is idling.

After reading the foregoing detailed description, it will be apparent that the objects set forth at the outset of the specification have been successfully achieved. Accordingly, what is claimed is:

1. A process for assuring complete combustion of a combustible mixture in an internal combustion engine to prevent the formation of toxic components in the engine exhaust gases while the engine is in idling condition, comprising the steps of:

provide a throttle means for controlling the flow of the combustible mixture within said engine;

coupling said throttle means to an air controlling means;

selectively operating said throttle means to admit sufficient combustible mixture to permit said engine to idle;

operating said air controlling means to supply extra air to said engine while said engine is idling, with the amount of said supplied extra air being sufficient to produce complete combustion of the combustible mixture within said engine;

gradually diminishing said supply of extra air in response to an increase in the opening of said throttle means; and completely eliminating said supply of extra air when said throttle means reaches a predetermined open position.

2. A device for controlling introduction of a supplemental air supply into the carburetor of an internal combustion engine to assure complete combustion of the combustible mixture therein with the flow rate of said combustible mixture being controlled by a throttle valve, said device comprising:

means having a central bore interconnecting said carburetor with an inlet manifold;

said means having an annular channel formed therein;

first and second relatively rotatable ring members with the latter concentrically and contiguously surrounding the former;

each of said ring members having a plurality of apertures equally circumferentially spaced therein;

said ring members being disposed within said means with the exterior of said second ring member being juxtaposed to said annular channel;

operating means operable to rotate said ring members relatively to one another to bring said first ring apertures selectively into and out of alignment with said second ring apertures; and, air supply means feeding a supply of extra air to said annular channel;

said operating means being operable responsively to operation of a throttle valve operating mechanism;

said operating means bringing said first and second ring apertures into alignment when said engine is idling whereby said supply of extra air feeds from said annular channel through said aligned apertures and into said central bore to thereby flow to said carburetor to create complete combustion of the combustible mixture therein;

said operating means gradually relatively rotating said ring members as said throttle valve progressively opens until said first and second ring apertures are moved out of alignment with one another, thereby preventing said extra air from reaching said central bore and thus interrupting said supply of extra air to said carburetor.

3. A device as defined in claim 2 wherein said operating means moves said ring member apertures out of alignment before said throttle valve reaches its maximum open position.

4. A device as defined in claim 2 wherein said second ring member is fixed in position and wherein said first ring member is connected to said operating means for rotation relative to said second ring member.

5. A device as defined in claim 2 wherein said first and second ring member apertures are frusto-conical and thereby have a small end and a large end with the aperture walls gradually diverging from said small end to said large end, said first ring member having its aperture small ends directed toward said second ring member and said second ring member having its small ends directed toward said first ring member, whereby when said first and second ring member apertures are moved into alignment, they create a venturi-jet which enhances extra air flow therethrough.

References Cited by the Examiner

UNITED STATES PATENTS

| | | | |
|---|---|---|---|
| 954,507 | 4/1910 | Fogler. | |
| 1,029,898 | 6/1912 | Stewart | 123—119 |
| 1,097,311 | 5/1914 | Gottschalk. | |
| 1,403,003 | 1/1922 | Beatson | 123—119 |
| 1,452,829 | 4/1923 | Edison | 123—124 |
| 1,463,532 | 7/1923 | Krichbaum | 123—124 |
| 1,463,909 | 8/1923 | Rivers | 123—124 |
| 1,505,288 | 8/1924 | Rivers et al. | 123—124 |
| 2,158,819 | 5/1939 | Gianatasio | 123—124 |
| 2,518,082 | 8/1950 | Shively | 123—124 |

KARL J. ALBRECHT, *Primary Examiner.*